(12) United States Patent
Depeursinge et al.

(10) Patent No.: US 6,431,622 B1
(45) Date of Patent: Aug. 13, 2002

(54) OBJECT MANIPULATOR ROBOT DEVICE

(75) Inventors: Yves Depeursinge, Servion; Pierre-Marcel Genequand, Geneva; Mario El-Khoury, Préverenges; Rēmy Hoehener, Neuchatel; Jean-Bernard Michel, Concise, all of (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 09/540,300

(22) Filed: Mar. 31, 2000

(30) Foreign Application Priority Data

Apr. 2, 1999 (FR) .............................................. 99 04146

(51) Int. Cl.7 ................................................ B25J 15/00
(52) U.S. Cl. ........................ 294/1.1; 294/86.4; 294/907; 901/30
(58) Field of Search ................................. 294/1.1, 86.4, 294/88, 99.1, 902, 907; 414/729; 901/30, 31, 36, 39, 50

(56) References Cited

U.S. PATENT DOCUMENTS

| | | | | |
|---|---|---|---|---|
| 3,140,890 A | * | 7/1964 | Schwartz | 294/1.1 |
| 3,611,744 A | * | 10/1971 | Sutz | 294/1.1 X |
| 4,667,998 A | * | 5/1987 | Borcea et al. | 294/88 |
| 5,452,932 A | * | 9/1995 | Griffin | 294/1.1 |

FOREIGN PATENT DOCUMENTS

| | | | | |
|---|---|---|---|---|
| CH | 670794 | * | 7/1989 | 294/86.4 |
| DE | 3701874 | | 8/1988 | |
| EP | 0706862 | | 10/1995 | |
| JP | 193732 | * | 8/1987 | 294/86.4 |
| SU | 1144879 | * | 3/1985 | 294/86.4 |

* cited by examiner

Primary Examiner—Johnny D. Cherry

(57) ABSTRACT

An object manipulator robot device includes a pick-up member made from a thermally conductive material and having at least one surface of contact with the object to be picked up, a system for cooling the pick-up member to freeze the interface between the member and the object, thereby fastening them together, including a local system for cooling the pick-up member directly and a peripheral system for cooling the local system, a system for heating the member to liquefy the interface, thereby releasing the object, and a control system for the cooling and heating systems. The local cooling system includes a pair of local cooling elements mounted on respective opposite sides of the pick-up member and the peripheral cooling system includes a pair of peripheral cooling elements connected to the local cooling elements by arms made from a material of high thermal conductivity, such as copper.

25 Claims, 2 Drawing Sheets

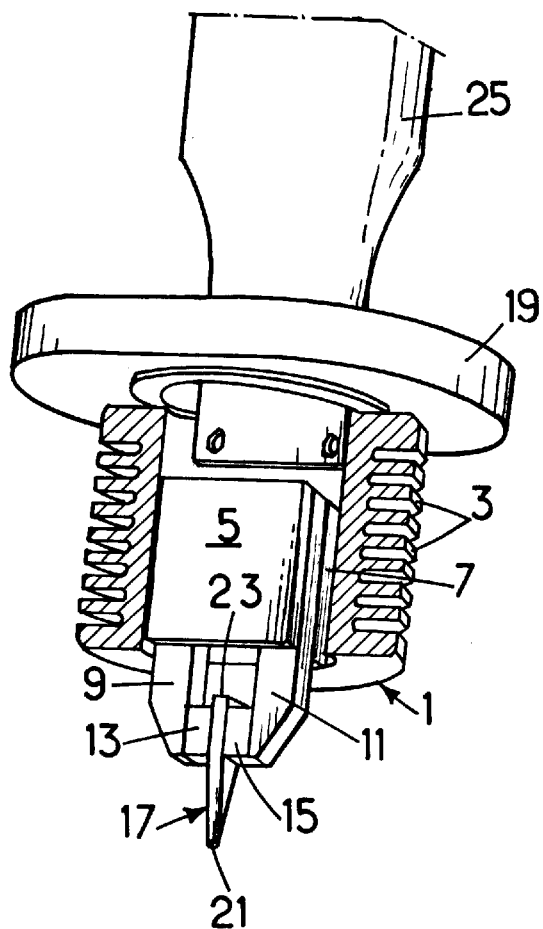
FIG.:1
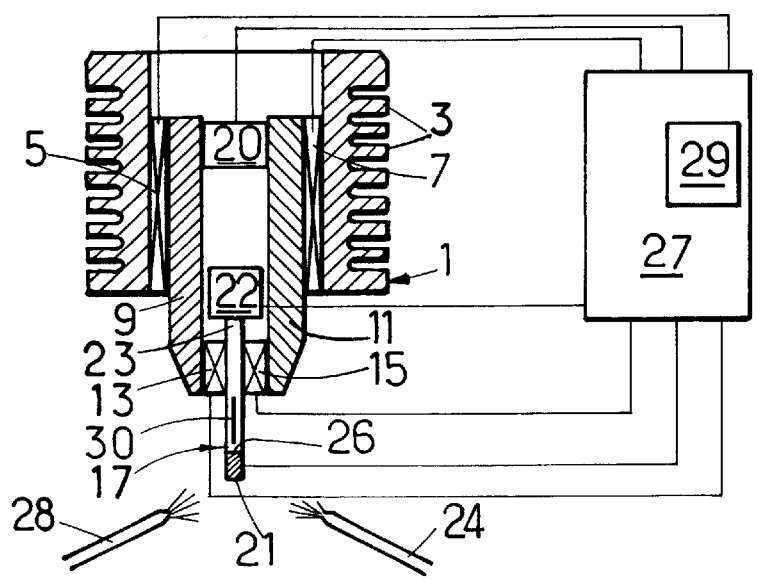
FIG.:2

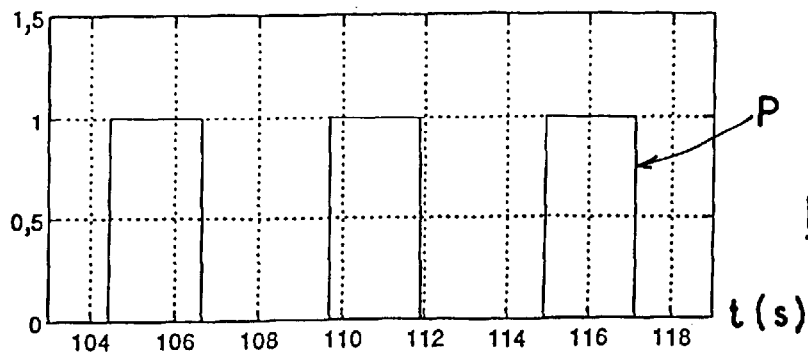
FIG.:3
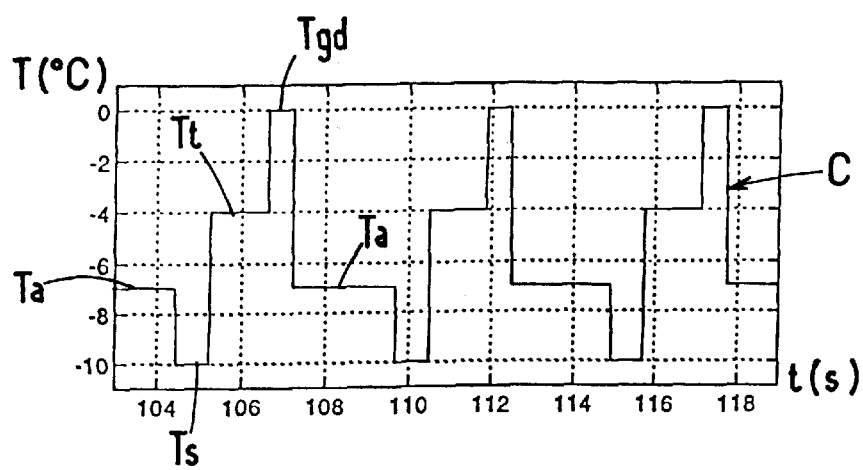
FIG.:4
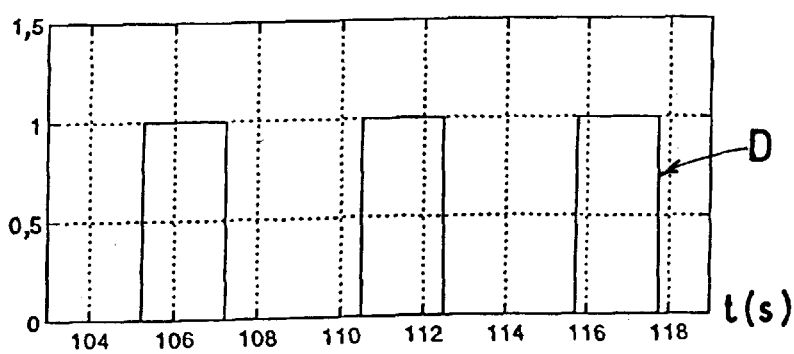
FIG.:5
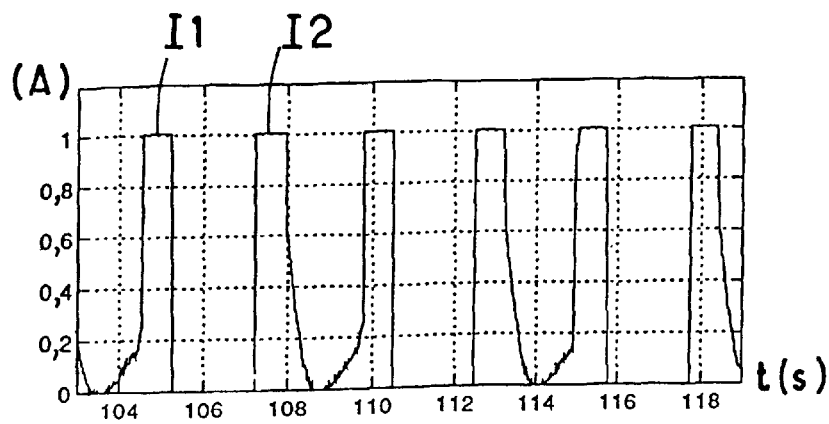
FIG.:6

OBJECT MANIPULATOR ROBOT DEVICE

BACKGROUND OF THE INVENTION

1. Field of the Invention

The present invention relates to an object manipulator robot device and to a method of manipulating objects with a robot equipped with a device of this kind.

This method and this device are particularly intended for precision industries such as the electronics industry or the clockmaking industry.

2. Description of the Prior Art

Patent application DE 37 01 874 discloses an object manipulator robot system including:

a pick-up member made from a thermally conductive material and having at least one surface of contact with the object to be picked up, means for cooling said pick-up member adapted to freeze the interface between said member and said object, thus fastening them together, including local means for cooling said pick-up member directly and peripheral means for cooling said local means, means for heating said member adapted to liquefy said interface, so releasing said object, and control means for said cooling means and said heating means.

The above system can manipulate large objects such as textile pieces at relatively high rates of operation.

The object of the present invention is to provide a system of the abovementioned type which is adapted to manipulate very small parts and which can achieve even higher rates of operation.

SUMMARY OF THE INVENTION

The above object of the invention is achieved with an object manipulator robot device including:

a pick-up member made from a thermally conductive material and having at least one surface of contact with the object to be picked up, means for cooling said pick-up member adapted to freeze the interface between said member and said object, thus fastening them together, including local means for cooling said pick-up member directly and peripheral means for cooling said local means, means for heating said member adapted to liquefy said interface, so releasing said object, and control means for said cooling means and said heating means, wherein said local cooling means include a pair of local cooling elements mounted on respective opposite sides of said pick-up member and said peripheral cooling means include a pair of peripheral cooling elements connected to said local cooling elements by arms made from a material of high thermal conductivity, such as copper.

Because of the above particular structure, a device is obtained in which the pick-up member has a very small surface of contact with the object to be picked up but areas of heat exchange with the local cooling elements that are sufficiently large to enable the pick-up member to be cooled very quickly.

A device is obtained in this way which can manipulate very small parts at a very much higher rate of operation than those of the prior art.

Another object of the present invention is to provide a method of manipulating objects applied to the abovementioned device and suited to a context of industrial fabrication at very high rates of operation.

The above object of the invention is achieved with a method of manipulating objects with a robot equipped with the above device, said method including the following steps:

controlling said peripheral cooling means so that they maintain said local cooling means in an environment in which the temperature is in the vicinity of said freezing/thawing temperature of said interface, placing said pick-up member above an object to be picked up, activating said local cooling means to freeze said interface to pick up said object, transporting said object from the location where it was picked up to a location at which it must be put down, and activating said heating means to liquefy said interface to put down said object.

Other features and advantages of the present invention will become apparent on reading the following description and examining the accompanying drawings.

BRIEF DESCRIPTION OF THE DRAWINGS

FIG. 1 is a partly cut-away perspective view of the device according to the invention.

FIG. 2 is a diagrammatic view of the device according to the invention in longitudinal section (the local and peripheral cooling elements are shown in the same plane).

FIGS. 3 to 5 are graphs representing control signals generated by the control means of the device according to the invention.

FIG. 6 is a graph showing an electrical current applied to the local cooling elements of the device according to the invention.

DETAILED DESCRIPTION OF THE PREFERRED EMBODIMENT

In the figures, identical reference numbers designate identical or analogous units or sets of units.

Refer now to FIGS. 1 and 2, which show that the device according to the invention includes a casing 1 that is preferably provided with cooling fins 3.

A pair of facing peripheral cooling elements 5, 7 is mounted inside the casing.

A pair of facing arms 9, 11 is mounted between the two peripheral cooling elements 5, 7.

A pair of facing local cooling elements 13, 15 is mounted between the two arms 9, 11.

A pick-up member such as a head 17 is mounted between the two local cooling elements 13, 15.

The device can include a flange 19 adjacent the casing 1 and adapted to receive a protection module (not shown).

The pick-up head 17 and the pair of local cooling elements 13, 15 are preferably removable from the remainder of the device by means (not shown) evident to the skilled person.

The device according to the invention further includes means 20 for measuring the temperature of the two arms 9, 11, which means can consist of a thermocouple.

Similarly, the device according to the invention includes means 22 for measuring the temperature of the end 21 of the pick-up head 17. Those means can consist of another thermocouple or, and advantageously, a thermistor providing the dual function of temperature measurement and heating element.

In variants that are described in French patent application FR2 725 651:

the device according to the invention can include means 24 for directing a flow of air and/or an interface liquid such as water to the end 21 of the picking up head 17, and heating elements 26 such as a resistor, coil or optical fiber can be placed as close as possible to this end 21.

The part 23 of the pick-up head 17 intended to be placed between the two local cooling elements 13, 15 can be flat and its end 21 adapted to pick up objects can be cylindrical, as shown here.

The length of the head is typically from 5 mm to 10 mm and the area of its end 21 is typically of the order of one square millimeter or less.

The head is made from a material of high thermal conductivity, such as copper or synthetic diamond, or a combination of those two materials.

Each of the peripheral cooling elements 5, 7 and local cooling elements 13, 15 can be in the form of Peltier effect components known to the skilled person.

The two arms 9, 11 are made from a material of high thermal conductivity, such as copper.

The device according to the invention is intended to be fixed to a robot 25 by any appropriate means evident to the skilled person.

The pairs of peripheral cooling elements 5, 7 and local cooling elements 13, 15, the heating elements and the robot 25 are connected to a control circuit 27 by a harness of electrical cables.

The control circuit includes, firstly, means for maintaining the two arms 9, 11 at a substantially constant temperature.

Those means can typically include a control loop comparing the actual temperature of the two arms 9, 11 as measured by the abovementioned thermocouple with a reference temperature and supplying at its output a signal for activating the pair of peripheral cooling elements 5, 7 in such manner as to reach said reference temperature.

The control circuit further includes means for adapting the temperature of the end 21 of the pick-up head 17 to the various operations to be effected.

Those means can include, firstly, a generator for generating a periodic position signal P which goes from 0 to 1 from the time at which the pick-up head 17 is placed above the object to be picked up and which reverts to 0 when that object has been picked up, transported and put down.

In the chosen example, the period of the signal P is approximately 6 seconds.

The signal is represented on the graph in FIG. 3, in which the time measured in seconds is plotted along the abscissa axis (this also applies to the graphs mentioned hereinafter).

The means for adapting the temperature of the pick-up head 17 to the various operations to be effected further include a generator which generates a temperature set point C (see FIG. 4) whose value fixes the temperature that must be reached by the pick-up head 17 during the phases of picking up, transporting and putting down the object concerned.

When the position signal P goes from 0 to 1, i.e. when the pick-up head 17 arrives above the object to be picked up, the temperature set point C goes from a waiting temperature Ta which is lower than a freezing/thawing temperature Tgd to a pick-up temperature Ts which is lower than Ta.

The freezing/thawing temperature Tgd is the temperature at which a substance at the interface between the end 21 of the head 17 and the object to be picked up solidifies or liquefies.

For example, this substance can be water from the moisture content of the atmosphere or water fed to the end 21 by the abovementioned means 24, possibly in the form of a spray.

During transportation of the object by the pick-up head, the temperature set point C goes from the temperature Ts to a transport temperature Tt higher than the waiting temperature Ta and lower than the freezing/thawing temperature Tgd.

When the signal P reverts to 0, i.e. when the transported object has reached its destination, the temperature set point C rises to the freezing/thawing temperature Tgd.

A short time later (approximately 1 second later in the chosen example), when the transported object has been put down, the temperature set point C reverts to the waiting temperature Ta.

If the moisture content of the atmosphere or liquid or sprayed water is used as the interface substance between the pick-up head and the object to be picked up, the abovementioned temperatures can typically have the following values:

Tgd=0° C.,
Ta=7° C.,
Ts=10° C.,
Tt=4° C.

Finally, the means for adapting the temperature of the pick-up head 17 to the various operations to be effected include means for heating the head to a temperature equal to the temperature set point C.

These means can typically include a control loop comparing the actual temperature of the end 21 of the pick-up head 17 as measured by the thermocouple (or by the thermistor) mentioned above to the temperature set point C and providing by way of an output signal a signal for activating the pair of local cooling elements 13, 15 or a signal for activating the heating elements referred to above (thermistor, resistor, coil, optical fiber), in such manner as to achieve said set point temperature C.

Furthermore, the control circuit 27 mentioned above includes means for controlling the movements of the robot 25 during manipulations.

These means can include a generator for generating a displacement signal D (see FIG. 5) whose value indicates when the robot 25 must move from its position for picking up the object concerned to its position for putting down that object, and vice versa.

The signal D goes from 0 to 1 when the temperature set point C goes from the pick-up temperature Ts to the transport temperature Tt, i.e. when the pick-up head 17 has picked up the object.

The signal D reverts from 1 to 0 when the temperature set point C goes from the freezing/thawing temperature Tgd to the waiting temperature Ta, i.e. when the pick-up head 17 has put down the object.

The operation of the device according to the invention follows directly from the foregoing description.

The control loop for the pair of peripheral cooling elements 5, 7 maintains the two arms 9, 11 substantially at the freezing/thawing temperature Tgd.

The pair of local cooling elements 13, 15 is therefore maintained in an environment whose temperature is also in the vicinity of the temperature Tgd.

The cooling fins 3 of the casing 1 evacuate to the exterior heat dissipated by the pair of peripheral cooling elements 5, 7. In one variant, the evacuated calories can be taken off by a flow of air generated by a cooling vortex device, for example.

The control loop of the pair of local cooling elements and the heating elements 26 mentioned above (thermistor, resistor, coil, optical fiber) adapt the temperature of the end 21 of the pick-up head 17 to the various operations of picking up, transporting and putting down the object concerned, in accordance with principles explained hereinafter.

When there is provision for feeding an interface substance such as water to the end 21, the succession of operations described hereinafter includes the preliminary step of spraying the object to be picked up with that substance.

When the temperature set point C goes from the waiting temperature Ta to the pick-up temperature Ts, the pair of local cooling elements 13, 15 is activated. This freezes the interface between the head and the object to be picked up, which fastens them together.

If the local cooling elements 13, 15 are Peltier effect components, they are activated by applying to them a short-duration "cooling" electrical current 11 whose value in amperes is represented on the FIG. 6 graph.

Because the pair of local cooling elements 13, 15 is placed in an environment whose temperature is permanently in the vicinity of the temperature Tgd, activating these elements very quickly reduces the temperature of the end 21 of the pick-up head 17 below the temperature Tgd.

Note at this point that supercooling can occur if the temperature of the end 21 of the pick-up head 17 is reduced suddenly, preventing freezing of the interface.

The risk of this phenomenon occurring increases if a sprayed interface liquid is used.

The supercooling phenomenon can be avoided by using a material such as synthetic diamond to coat the end 21 of the pick-up head 17 or to form the whole of the latter.

In one variant, this phenomenon can be avoided by adding certain additives, such as iodine, to the interface liquid.

When the set point temperature C goes from the pick-up temperature Ts to the transport temperature Tt, the pick-up head 17 is allowed to warm up of its own accord, due to the effect of the temperature of the air of the atmosphere.

To this end, neither the pair of local cooling elements 13, 15 nor the heating elements mentioned above are activated.

Given that the transport temperature Tt is lower than the freezing/thawing temperature Tgd, the interface between the pick-up head and the object is sure to remain frozen and it is therefore certain that the head can be moved without risk of the object becoming detached.

When the set point temperature C passes from the transport temperature Tt to the freezing/thawing temperature Tgd, the abovementioned heating elements are activated. The interface between the head and the transported object is therefore liquefied, which enables the object to be put down at the required location.

In a variant which is feasible when the local cooling elements 13, 15 are Peltier effect components, the pick-up head 17 can be heated by applying a "heating" electrical current to the elements in the direction opposite to that of the abovementioned "cooling" current. This option has the drawback of leading to faster wear of the elements.

Allowing the temperature of the pick-up head to rise from the pick-up temperature Ts anticipates the heating of the head to the temperature Tgd and therefore liquefies virtually instantaneously the interface between the head and the object when the latter is to be put down.

When the temperature set point passes from the freezing/thawing temperature Tgd to the waiting temperature Ta, the pair of local cooling elements 13, 15 is activated again.

When the local cooling elements 13, 15 are Peltier effect components, they are activated by applying to them a short duration "cooling current" 12 shown in FIG. 6.

Lowering the temperature of the pick-up head 17 to the waiting temperature Ta anticipates the cooling of the head to the pick-up temperature Ts and therefore freezes virtually instantaneously the interface between the head and the object when the latter is to be picked up.

In a variant which is feasible when the local cooling elements 13, 15 are Peltier effect components, to heat the pick-up head 17 to the required temperature quickly without being penalized by its thermal inertia, the "cooling" and "heating" currents mentioned above can selectively take a high absolute value Imax or a low absolute value Imin, according to whether the difference between the actual temperature of the head and the temperature set point C is high or not, respectively.

The displacement signal D is used to control the displacements of the robot 25 between the location at which the object concerned must be picked up and the location at which it must be put down.

When this signal has the value 1, the robot 25 is moved from the location at which the object was picked up towards the location at which it must be put down. The reverse applies when this signal has the value 0.

As is now clear, the structure of the device according to the invention provides a pick-up head 17 which has a small area of contact with the object to be picked up and areas of heat exchange with the local cooling elements 13, 15 which are sufficiently large to enable the pick-up head to be cooled very quickly.

This provides a device which can manipulate very small parts at a very much higher rate of operation than those of the prior art.

It has been shown that other factors contribute to shortening the cooling/heating cycles of the pick-up head 17:

the "two-stage" structure of the cooling means, anticipating the freezing and thawing temperatures, which attenuates the effects of delay due to the thermal inertia of the pick-up head, and if Peltier effect components are used, applying currents which vary according to the temperature difference to be eliminated, also attenuating unwanted effects of the thermal inertia of the pick-up head.

Note also that the geometry of the device according to the invention readily lends itself to operations of mounting and demounting the pick-up head.

Accordingly, in contrast to prior art systems, a pick-up head can be replaced with another one (which is either different or identical, as appropriate), without having to replace the entire device.

All the above advantages render the device according to the invention particularly suitable for a precision industrial fabrication context at very high rates of operation.

Of course, the invention is not limited to the embodiment described and shown, which is provided by way of illustrative and non-limiting example.

For example, mechanical means (finger operated by a solenoid, flow of compressed air 28, etc.) or ultrasound can be used in combination with the heating means mentioned above to contribute to releasing the transported object from the pick-up head.

Also, means could be provided for detecting premature dropping of the transported object.

Given that it has been observed that dropping the object has led to a sudden variation of temperature in the pick-up head, said means could include a circuit 29 for detecting such temperature variations.

Also, means could be provided to prevent any physical contact between the pickup head and the object to be picked up. Such means can prove necessary if the object to be picked up is extremely fragile.

Such means could include, for example, an optical fiber 30 inside the pick-up head for observing variations of refractive index in the interface between the head and the object to be picked up.

In another variant, these means could include a circuit for detecting variations in temperature caused by the interface liquid coming into contact with the pick-up head just before grasping the object (a circuit of this kind would be analogous to that mentioned hereinabove).

What is claimed is:

1. An object manipulator robot device including:
   a pick-up member made comprising a thermally conductive material and having a surface of contact with the object to be picked up,
   means for cooling said pick-up member for freezing the interface between said member and said object, for fastening them together, including local means for cooling said pick-up member directly and peripheral means for cooling said local means,
   means for heating said member for liquefying said interface, so releasing said object, and
   control means for said cooling means and said heating means,
     wherein said local cooling means include a pair of local cooling elements mounted on respective opposite sides of said pick-up member and said peripheral cooling means include a pair of peripheral cooling elements connected to said local cooling elements by arms comprising a material of high thermal conductivity.

2. The device claimed in claim 1 including a pair of facing arms mounted between said peripheral cooling elements and wherein said local cooling elements are mounted between said two facing arms.

3. The device claimed in claim 1 wherein said local cooling elements and said peripheral cooling elements are Peltier effect components.

4. The device claimed in claim 1 wherein said puck-up member has a flat part between said local cooling elements and wherein said surface of contact is round.

5. The device claimed in claim 1 wherein said pick-up member and said pair of local cooling elements are removable from the remainder of said device.

6. The device claimed in claim 1 wherein said pick-up member is made of a material of high thermal conductivity chosen from the group consisting of copper, synthetic diamond and a combination of those two materials.

7. The device claimed in claim 1 wherein said heating means are placed proximate said surface of contact and include components chosen from the group consisting of thermistors, resistors, coils and optical fibers.

8. The device claimed in claim 1 wherein said control means include means for controlling said local cooling means and said heating means by a temperature set point defined as a function of the operations to be effected and include feedback means for regulating said peripheral cooling means according to a reference temperature in the vicinity of a freezing/thawing temperature of said interface.

9. The device claimed in claim 1 wherein said control means include temperature measuring means chosen from the group consisting of thermocouples and thermistors.

10. The device claimed in claim 1 including means for evacuating to the exterior heat dissipated by said peripheral cooling means.

11. The device claimed in claim 10 wherein said heat evacuating means are chosen from group consisting of casing with cooling fins and air flow means.

12. The device claimed in claim 1 including means for feeding an interface liquid to said surface of contact.

13. The device claimed in claim 12 wherein said interface liquid is water.

14. The device claimed in claim 1 including means to facilitate release of an object transported by said pick-up member.

15. The device claimed in claim 14 wherein said release means are chosen from the group consisting of a finger operated by a solenoid, compressed air flow means and ultrasound.

16. The device claimed in claim 1 including means for detecting premature dropping of a transported object.

17. The device claimed in claim 16 where said means for detecting include a circuit for detecting temperature variations in said pick-up member.

18. The device claimed in claim 1 including means for preventing physical contact between said pick-up member and an object to be picked up.

19. The device claimed in claim 18 wherein said means for preventing physical contact are chosen from the group comprising an optical fiber inside said pick-up member adapted to observe refractive index variations in said interface and a circuit adapted to detect temperature variations in said pick-up member.

20. A method of manipulating objects with a robot equipped with a device as claimed in claim 1, said method including the following steps:
    controlling said peripheral cooling means for maintaining said local cooling means in an environment in which the temperature is in the vicinity of the freezing/thawing temperature of said interface,
    placing said pick-up member above an object to be picked up,
    activating said local cooling means to freeze said interface to pick up said object,
    transporting said object from the location where it was picked up to a location at which it must be put down, and
    activating said heating means to liquefy said interface to put down said object.

21. The method claimed in claim 20 including the step of activating said local cooling means before picking up said object so as to freeze said interface virtually instantaneously when said object is picked up.

22. The method claimed in claim 20 including the step of allowing said pick-up member to warm up in the air of the atmosphere before putting down said object so as to liquefy said interface virtually instantaneously when said object is put down.

23. The method claimed in claim 20 wherein said local cooling elements are Peltier effect components and including the step of choosing the electrical current applied to said local Peltier effect components as a function of the difference between the actual temperature of said pick-up member and a temperature set point.

24. The method claimed in claim 20 wherein said local cooling elements are Peltier effect components and wherein said step of activating said heating means consists of applying a "heating" electrical current to said local Peltier effect components.

25. The method claimed in claim 20 including the step of spraying said object with an interface liquid before picking up said object.

* * * * *